United States Patent
Faris et al.

(10) Patent No.: US 8,595,183 B2
(45) Date of Patent: Nov. 26, 2013

(54) SYSTEMS AND METHODS FOR PROVIDING ENHANCED CONTENT PORTABILITY IN A WORD PAGE MODULE

(75) Inventors: Andrew Boath Faris, Venice, CA (US); Anthony Dominic Amidei, Santa Monica, CA (US); Joshua Allen Rehling, Santa Monica, CA (US); Stephen Garcia, Santa Monica, CA (US)

(73) Assignee: Yahoo! Inc., Sunnyvale, CA (US)

( * ) Notice: Subject to any disclaimer, the term of this patent is extended or adjusted under 35 U.S.C. 154(b) by 435 days.

(21) Appl. No.: 11/836,721

(22) Filed: Aug. 9, 2007

(65) Prior Publication Data
US 2009/0043754 A1    Feb. 12, 2009

(51) Int. Cl.
*G06F 17/30* (2006.01)

(52) U.S. Cl.
USPC .......................................................... 707/609

(58) Field of Classification Search
USPC .......................................................... 707/609
See application file for complete search history.

(56) References Cited

U.S. PATENT DOCUMENTS

| | | | |
|---|---|---|---|
| 2006/0080710 A1* | 4/2006 | Carthern | 725/47 |
| 2008/0178230 A1* | 7/2008 | Eyal et al. | 725/86 |
| 2008/0276279 A1* | 11/2008 | Gossweiler et al. | 725/46 |
| 2009/0006192 A1* | 1/2009 | Martinez et al. | 705/14 |

\* cited by examiner

*Primary Examiner* — Hosain Alam
*Assistant Examiner* — Johnese Johnson
(74) *Attorney, Agent, or Firm* — Martine Penilla Group, LLC (57) ABSTRACT

A computer implemented method for porting a visual object from a word page to another website is disclosed. The other website is accessible to the word page via Internet. The method includes enabling user selection of the visual object for transferring to the other website, and enabling user identification of the other website. The method also includes determining a communication interface of the other website. The communication interface defines one or more of acceptable content format, data types, size, and metadata. The method further includes transferring the visual object to the other website via the communication interface upon receiving instructions to port the selected visual object.

23 Claims, 4 Drawing Sheets

SYSTEMS AND METHODS FOR PROVIDING ENHANCED CONTENT PORTABILITY IN A WORD PAGE MODULE

CROSS REFERENCE TO RELATED APPLICATIONS

This application is related to co-pending: (1) U.S. patent application Ser. No. 11/836,724, filed on Aug. 9, 2007, entitled "Systems and Methods for Dynamic Page Creation", (2) U.S. patent application Ser. No. 11/836,723, filed on Aug. 9, 2007, entitled "Systems and Methods for Comments Aggregation and Carryover in Word Pages", (3) U.S. patent application Ser. No. 11/836,719, filed on Aug. 9, 2007, entitled "Systems and Methods for Providing a Multi-function Search Box for Creating Word Pages", and, (4) U.S. patent application Ser. No. 11/836,717, filed on Aug. 9, 2007, entitled "Systems and Methods for Providing a Persistent Navigation Bar in a Word Page", each of which is incorporated herein by reference.

FIELD OF THE INVENTION

This invention generally relates to displaying information related to a given word. More specifically but without limitation, this invention relates to providing content portability functionality in a page module to enable porting user selected contents to other websites or information sharing services.

BACKGROUND OF THE INVENTION

The computing industry has seen many advances in recent years, and such advances have produced a multitude products and services. Internet websites are examples of products and services, which are created to give users access to particular types of services, data, or searching capabilities. Today, websites can be readily created by most individuals desiring to post information or provide access or connectivity to other data. Websites are also created, updated, and supported to provide constantly updated current event information, news, and other information. This data is highly managed and processed so that its presentation can be easily displayed on web browsers or other Internet connected devices.

In recent years, social networking and information sharing through Internet among the Internet users have increased phenomenally. Currently to date, however, the traditional websites do not provide functionality to enable users to share content by moving, referencing, or copying the content selectively and effortlessly from one website to another websites or the Internet resources.

It is within this context that embodiments of the invention arise.

SUMMARY OF INVENTION

Broadly speaking, the present invention fills these needs by providing a modular system that generates a word page including one or more page modules for a user entered word and enables users to port content of a word page to another websites and Internet resources selectively and effortlessly. The word page is a website that is focused around a user entered word and includes one or more page modules, each containing content related to various verticals that are contextually related to the user entered word. The embodiments of the present invention enable users to port the selected content of the word page simply by clicking appropriate controls on the selected content. The porting of the content includes copying, referencing, or moving the content of the page modules in the word page to other websites or the Internet resources.

In one embodiment, a computer implemented method for porting a visual object from a word page to another website is disclosed. The other website is accessible to the word page via Internet. The method includes enabling user selection of the visual object for transferring to the other website, and enabling user identification of the other website. The method also includes determining a communication interface of the other website. The communication interface defines one or more of acceptable content format, data types, size, and metadata. The method further includes transferring the visual object to the other website via the communication interface upon receiving instructions to port the selected visual object.

In another embodiment, a page module for a word wherein the page module is dynamically created through user action related to the word is provided. The page module includes a word bar to display a plurality of contextually related words wherein each of the plurality of related words is related to the word with a subject context. The page module also includes a media display area to display media, and a porting control to enable transfer of the page module to another website. The porting control is native to a word page, such that the word module remains in the word page if the transfer of the page module occurs through the porting control.

In yet another embodiment, a computer readable media having program instructions for porting a visual object from a word page to another website is provided. The other website is accessible to the word page via Internet. The computer readable media includes program instructions for enabling a user to select the visual object for transferring to the other website, and program instructions for user identification of the other website. The computer readable media also includes program instructions for determining a communication interface of the other website, and program instructions for transferring the visual object to the second website via the communication interface, the program instructions for the transferring includes program instructions for maintaining a tracking information of the porting in a favorites page module of a user.

The advantages of the present invention are numerous. Most notably, the system and apparatus described herein provide porting of the selected content in the word page to other websites and the Internet resources. The system enables a user to select either the whole page module or content such as a picture or a video in the page module and port the selected content to one or more external websites by clicking on the porting controls associated to the selected content. The external websites are configured in the word website to enable transparent internal access to the destination website by the word page to port the selected content. Hence, users don't need to manually copy/paste the selected content from the word page to one or more external websites.

Other aspects and advantages of the present invention will become apparent from the following detailed description, taken in conjunction with the accompanying drawings, illustrating by way of example the principles of the present invention.

BRIEF DESCRIPTION OF DRAWINGS

The present invention will be readily understood by the following detailed description in conjunction with the accompanying drawings. To facilitate this description, like reference numerals designate like structural elements.

The figures are provided in order to provide a thorough understanding of the present invention. The figures should not be construed as limiting the breath of the invention in any manner.

DETAILED DESCRIPTION

A system and apparatus for porting the selected content in a word page to the external websites or the Internet resources is disclosed. A "word page" includes page modules that present content having specific context. Context can be defined based on types of media, or categories with a type of media. In one embodiment, a "vertical" defines a type of media, such as music, movies, communication, shopping, gaming, etc. Within each vertical, further contextual categories can be defined. For instance, within music, a context can be defined for types of music, each artist, etc. Thus, for purposes of clarity, the degrees and granularity by which types of context can be broken up or organized can grow over time, as further context definitions are generated for words. The "word page", as used herein, is a web page, that is constructed from one or more page modules. The page modules, as noted above, will each define a type of content, such as movie related content, music related content, picture related content, game related content, video related content, gossip related content, etc. that the entered word will be used to rearrange, construct or obtain content that will define the presentation, data, interactivity, images, etc., of specific page modules. Thus, the word page is a contained page, that dynamically changes, depending on the selected or entered word. A word page is therefore not a search engine or search interface that triggers a search of web links or external websites. To the contrary, the word page will contain or generate one or more page modules, and the data that is presented in each of the page modules dynamically changes or is updated over time or based on the entered "word" in the multi-function search box or the selection of specific "words" within a particular page module of the word page.

The page modules that are generated for the entered word contain content that are contextually related to the entered word. The page modules and the content therein also include user interface controls to enable users to port a selected content to one or more external website. The users may either port the whole page module or a selected content displayed in the page module by choosing appropriate porting controls in the page modules. The selected content including the selected page modules may also be added to user's favorites module or emailed to one or more email addresses by choosing appropriate porting controls. The porting controls are configurable to enable the users or the administrators of the word website to add new features such as faxing of the selected content, adding external websites in the porting control menus, adding the selected content to the RSS (Really Simple Syndication) Internet resource, etc. In one example, the user may choose to port a page module containing interesting content to his/her profile page in a social networking website (e.g. mySpace™, YouTube™, or any similar social networking website) to share the information with his/her online social network. In another example, the user may port a picture in a page module to his/her profile page in a social networking website (e.g. mySpace™, YouTube™, etc.).

As used herein, to be "contextually related" means that a particular word, that may be entered by a user is related to other words or phrases. Other words or phrases may be related in terms of context, and the context means that there is some weaving together of words, in terms of meaning, subject, or a combination thereof. Thus, words that are contextually related to other words or phrases may be connected in terms of coherence. Still further, context can be thought of in terms of parts of a discourse that surround a word or passage and can throw light on the meaning of the entered word. Some words, that are considered contextually related may be defined based on some descriptive interrelation, dependence, or condition, based on a theme, environment, setting, event, group of similar media, similar activities, or combinations thereof. Media, in one embodiment, is defined as one of a still picture, a video, a graphic, a movie, a game, a commentary, a plurality of images, a text blog, a comment, or combinations thereof.

With this overview in mind, the following figures will illustrate example structure and functionality of the content porting functionality of word pages.

Figure 1:
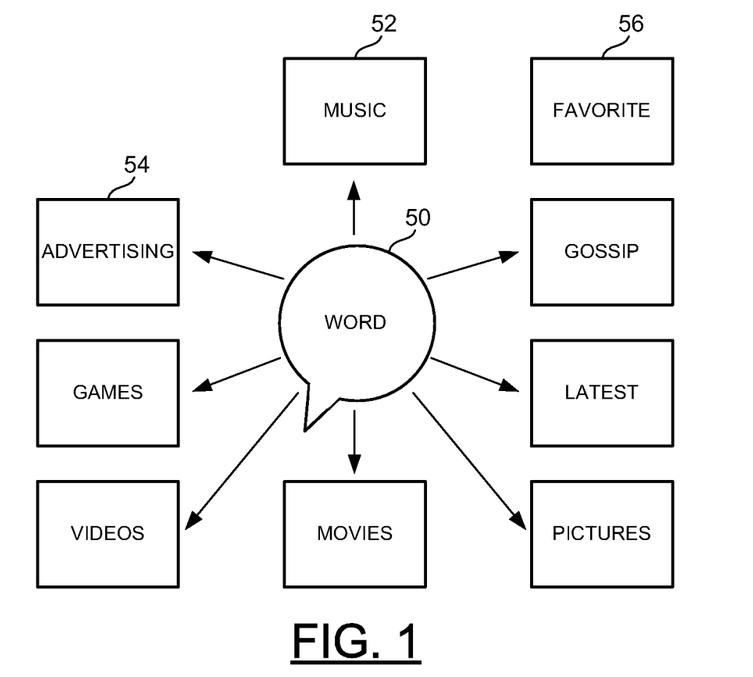
FIG. 1 illustrates a broad relationship between a word and different types of page modules, in accordance with one embodiment of the present invention.

FIG. 1 illustrates a word 50 and various broad types of page modules 52, sponsored modules 54, and, favorites module 56. Word 50 relates to a concept, person, brand, etc and functions as a carrier of meaning. In one embodiment, the page modules 52 are categorized by a specific type of content type such as music, movie, gossip, latest, etc. New content types may be added to create a new page module 52. The sponsored module 54 is a special type of module that is provided or built specifically to host selected sponsored content associated with a particular word 50.

In one embodiment, the favorite module 56 is a special type of page module that is used for storing pointers or references to page modules 52 that were previously marked as "favorite". In another embodiment, various user defined content or links to external resources, media, movie clips, albums, etc. may also be stored in the favorite module 56. In yet another embodiment, the favorite module 56 contains content specific to a particular user. Such content is added to the favorite module 56 through user action. In yet another embodiment, one or more page modules 52 are generated for the entered word 50 "favorite". The page modules 52 that are generated for the entered word 50 "favorite" contain user's favorite content in one or more vertical category such as music, movies, events, etc. User's favorite content in one embodiment is based on the logged in user's the user profile information including at least one of user's preferences, age, sexual orientation, geographical location. In another embodiment, if the user has not logged in, user's content browsing pattern and interactivity with the page modules is stored the cookies or temporary files which are then used to generate or assemble user's favorite content in various vertical content categories. In yet another embodiment, the generation of user's favorite content is based on a combination of user profile information and user's interactivity with the page modules 52 during one or more prior word website browsing sessions.

As illustrated in FIG. 1, word 50 surrounded by page modules 52, sponsored modules 54, and favorites module 56, signifies that a quest for information related to the word 50 leads to generation of various types of page modules 52 and sponsored modules 54, each hosting a specific type of content. FIG. 1 further illustrates that generation of the word page revolves around selection of the word 50, i.e. information displayed through various page modules 52 is focused on the selected word 50. For example, selecting "popular" for word 50 will generate a word page with the most popular content for each respective page module (such as popular movie, popular music, popular celebrity, popular fashion, popular club, etc.). A new word page including a different set of page modules 52, is generated every time a new word 50 is selected. Hence, in above example, when the selection changes from "popular" to "newest", a new word page including page modules 52 such as "newest movies", "newest music album", "newest car models", etc. will be generated.

In one embodiment, the system maintains a list of words 50 and a list of appropriate page modules 52 for various types of content related to each of the words 50 in the list. In one embodiment, words 50 and page modules 52 are maintained and updated by the information editors with the help of user's browsing patterns, latest stories about various celebrities, products, etc., various topics that users may be interested in, the latest news, etc. Content are grouped in different categories such as content related to a particular subject or word suitable or liked to a particular segment of users. In one embodiment, contents are regularly and continuously updated to keep up with the latest developments. In another embodiment, various types of contents are scanned and obtained from various electronic media sources automatically, based on context based search filters.

Figure 2:
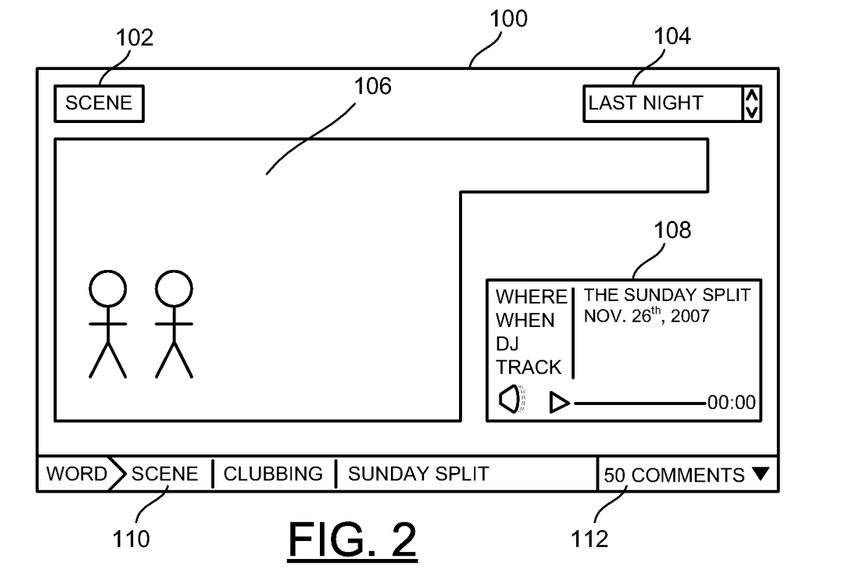
FIG. 2 illustrates a page module layout showing various placeholders of a page module, in accordance with one embodiment of the present invention.

FIG. 2 illustrates a page module layout 100. In one embodiment, the page module layout 100 includes a title 102, a filter 104, an interactive media space 106, a media metadata placeholder 108, a word bar 110, and a comments control 112. The page module layout 100 is capable of being modified to accommodate different types of content. For example, media metadata placeholder 108 may be made invisible to enable interactive media space 106 to be used for a full screen media display. In another example, interactive media space 106 may be broken up into two or more media spaces for showing multiple media content simultaneously or side-by-side. In yet another example, a section of interactive media space 106 may be used for playing a video while other sections may be used for displaying thumbnail pointers to other media content.

The title 102 is used to display a title of content of a page module 52, sponsored module 54, or, favorites module 56. Text displayed in the title 102 is also a word 52, i.e. the title is selectable by a user and such selection would also triggers a generation of a new word page focused around the word 50 in the title 102. In one embodiment, some of the commonly used titles are music, movie, latest, gossip, etc. Title 102 is generally a topic name of content in the page module 52. For example, a page module 52 with title 102 text "music" will have contents either directly or contextually related to music.

Still referring to FIG. 2, because title 102 is also a word 50 that has its own context around it, selecting the title 102 will generate a new word page to display various page modules 52 centered or focused around the word. For example, in a word page focused around word 50 "Lindsay Lohan" that contains a module named "Music" (i.e. "Music" is the title 102 of the page module 52) featuring the music of "Lindsay Lohan", selecting (or clicking) on the title 102 of "Music" page module 52 would cause generation of a new word page now focused at music. This new word page will, for instance, have page modules 52 focused on classical music, newest music album, heavy metal, jazz, etc., all centered around and focused on "Music". Thus, as used herein, a word does not have to be a single word, but can be a set of words to define a person, place or thing. A word, however, is different than a phrase which may be in the form of a sentence. Therefore, broadly speaking, a word can be a single word or tight collection of words that convey context.

Thus, cyclic generation of word pages that include only contextually relevant and highly focused information provide a higher degree of browsing experience because the user is not forced to jump from one website to another website in search of relevant content.

In one embodiment, the word bar 110 is provided to display other words 50 related to the subject matter of the page module 52. Word bar 110 may include words 50 that are contextually related to the subject matter of content of the page module 52. For example, word bar 110 in a scene module may contain words 50 "Clubbing", "Sunday Split", etc. because these words 50 are contextually related to the topic of page module 52.

In one embodiment, the word bar 110 may also contain one or more sponsored words 50. The sponsored words 50 are bought (or paid for) by advertisers and can be displayed in the word bar 110 when a specified sponsoring criteria is met. In another embodiment, the system identifies a sponsored word to be included in the word bar 110 based on the user interest in a particular type of subject matter, user's past browsing history, user's like for a particular brand, etc. Selecting a word 50 in the word bar 110 will generate a new word page to display page modules 52 and optionally sponsored modules 54 centered around and focused on the word 50 selected through word bar 110. Hence, in this embodiment, if a word page is generated around a word 50 "Celebrity" in which a page module named "Music" is displayed, the word 50 "N-Sync" would appear in the word bar 110. Selecting (or clicking) the word 50 "N-Sync" in the word bar 110 will cause generation of a new word page. This new word page will, for instance, have page modules 52 such as Music, Latest, Gossip, etc., all centered or focused around the word "N-Sync".

Figure 3:
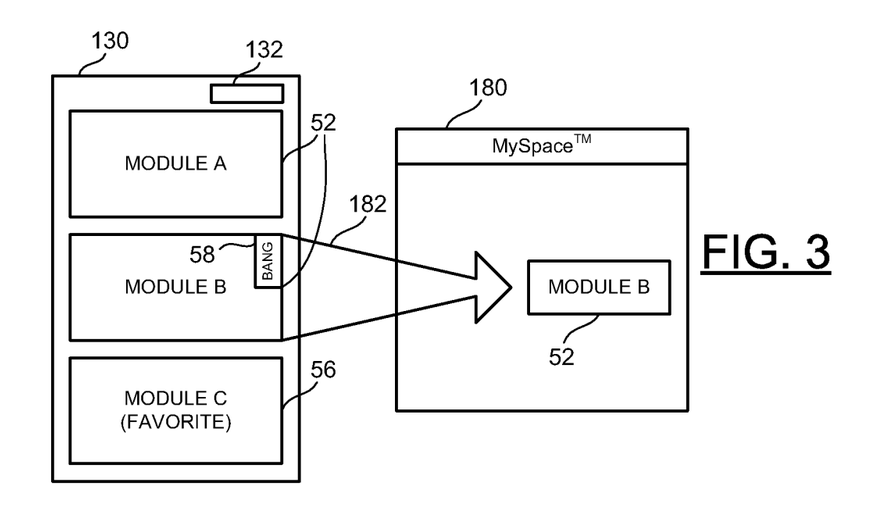
FIG. 3 illustrates porting of a page module to mySpace™ website, in accordance with one embodiment of the present invention.

Referring now to FIG. 3, which illustrates the porting 182 of a page module to the mySpace™ website, in one embodiment. The name mySpace™ is being used throughout in this document only for providing a better understanding of the embodiments of current invention. It may be noted that any social networking website (e.g. mySpace™, YouTube™, etc.) may be used to practice embodiments of this invention. In another embodiment, the page module may be ported to any external Internet website so long as the website exposes a communication or programming interface to allow porting the content from other resources. A word page 130 includes a multifunction search box 132 to enable the users to enter a word 50 or select a word 50 or a category of content from the multifunction search box 132. The word page 130 focused around the entered or selected word 50 or content category is then generated. The word page 130 includes one or more page modules 52 hosting content that are contextually related to the entered word 50. In one embodiment, a favorites module 56 is also displayed in the word page 130. In one embodiment, the favorites module 56 contains content that were previously marked as "favorite" by the user by porting the selected page modules to the "favorite" module.

Still referring to FIG. 3, in one embodiment, each page module 42 includes a "BANG" control or button 58. The user may use the "BANG" control 58 to port the selected page module 52 to a web page in another website (e.g. user's profile page in the mySpace™ website, or any other social networking website). To enable porting 182, the external website provides a programming or communication interface. In one embodiment, the communication interface defines content transferring mechanism including acceptable content format, data types, metadata etc. In one example, the communication interface also defines a maximum size of content that can be transferred in as a part of transferring the page module or a content of the page module. In another example the communication interface defines acceptable screen resolution of various media formats. In another example, the communication interface defines parameters, functions, methods, metadata, data transfer protocol, content types, content sizes, etc. in a way necessary for the word page in the word website to transfer the selected content of the page module to the another website. Through the metadata provided by the communication interface, the word page 130 formats content to be ported in the format acceptable to the external website.

In one embodiment, porting 182 data is stored in a data store such as a relational database to facilitate tracking of ported content. For each ported page module or for each ported content in the page module, a tracking information is maintained. The tracking record is stored in the data store. The tracking information includes one or more of the identification of the page module or the content, date/time of porting, identifier of the receiving Internet website or resource, etc. In one embodiment, the tracking information is incorporated in user's favorites page module 56. In one embodiment, a preview of the content being ported is displayed to the user before initiating the porting 182.

In one embodiment, the word page maintains a list of external resources for each user of the word page. In another embodiment, the list of external resources (e.g. external Internet websites) is maintained as a part of user profile information. The list of external resources and user credentials (e.g. user name and password) are stored in a persistent database. A persistent database in one embodiment is a relational database. In other embodiments an active directory server, LDAP, or any other type of database may be used, as long as the database or LDAP is able to store the list and user credentials in a manner that enables later selective retrieval of the stored information. One or more entries from the list of external websites may be selected by the user during porting of the selected content; the content is then ported to all selected websites. The word page uses the user credentials that are stored with the external website identifiers in the list to silently log into the external website. If the user credentials are not found in the persistent data store, the word page requests the user to enter login information of the selected external website at the time of porting of the selected content.

Figure 4:
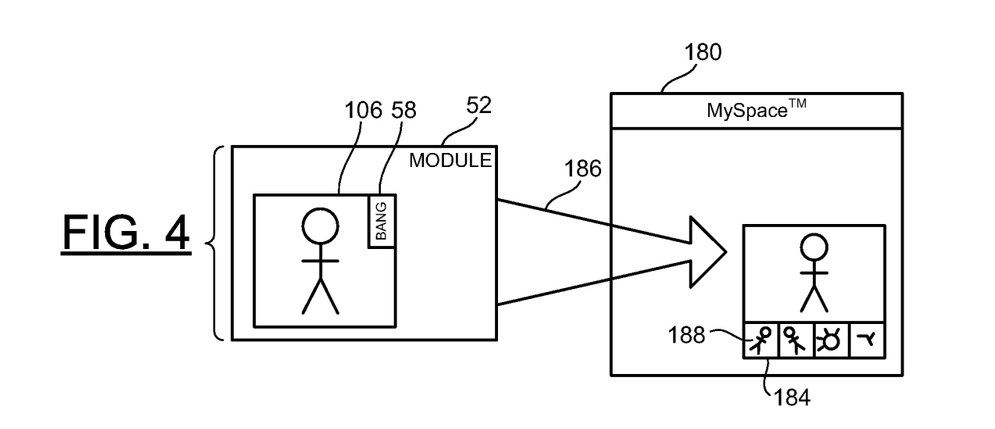
FIG. 4 illustrates porting of a picture in a page module to mySpace™ website, in accordance with one embodiment of the present invention.

Referring now to FIG. 4. The content in the page module may also be ported to the external websites by the user of the "BANG" control 58. In one embodiment, a "BANG" control 58 is associated with each media content (e.g. picture, movie, song, etc.) in page modules. In one example, the "BANG" control 58 may be used to port 186 a picture in the interactive media space 106 of the page module 52 to a selected external website. The external website (mySpace™ in this example) will show the ported picture in a picture holder 184. The picture holder 184 includes a picture strip 188 to show thumbnails of all ported pictures. A thumbnail may be selected to display the ported picture in normal size in the picture holder 184.

Figure 5:
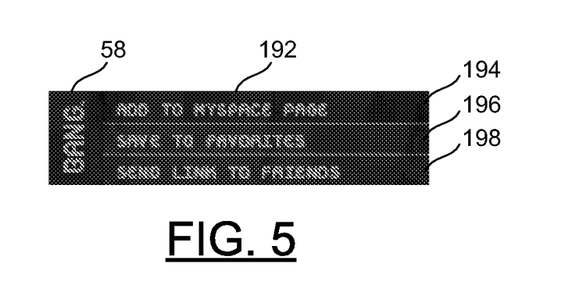
FIG. 5 illustrates the BANG control, in accordance with one embodiment of the present invention.

FIG. 5 illustrates the "BANG" control 58 in one embodiment. The "BANG" control 58 includes a control to add 192 the selected content to user's mySpace™ profile page (or any other social networking website), a control to save 196 the selected content to user's favorites module 56, and a control to email 198 the content or a link to the selected content to anyone such as a friend or friends. In another embodiment, one or more user selected external websites from the list of external websites may be included in the "BANG" control 58 to enable the users to add the selected content to one or more of such external websites directly through the "BANG" control 58. It may be noted that the caption "BANG" for the "BANG" control 58 is being used for illustration only. Any appropriate caption may be used for the "BANG" control 58.

Figure 6:
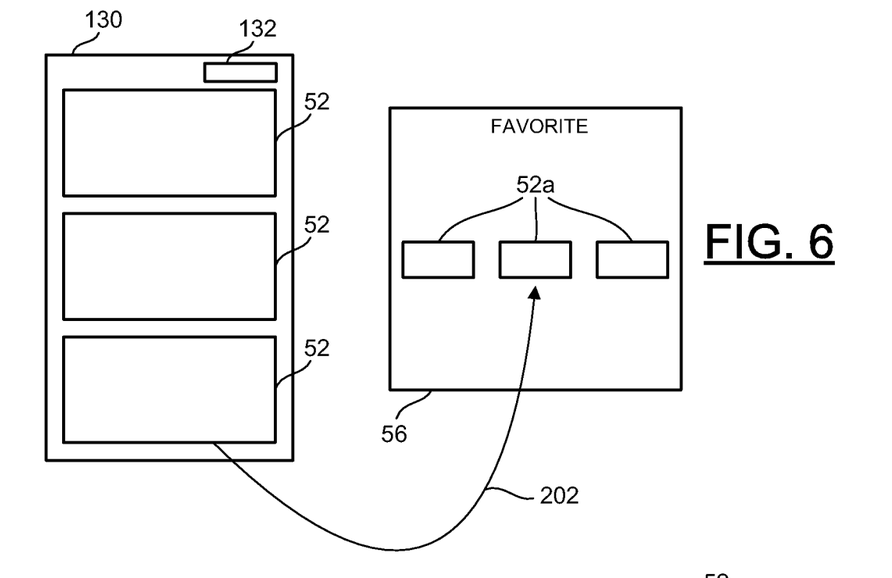
FIG. 6 illustrates porting of user's favorites module to mySpace™ website, in accordance with one embodiment of the present invention.

FIG. 6 illustrates saving 202 of the selected content of the page module or the page module itself in user's favorites module 56. The multifunction search box 132 may be used to enter or select a word 50 to generate a word page 130 focused around the entered or selected word 50. The user, through the BANG control 58, may save a link to the selected page module or content of the page module to user's favorites module 56. In one embodiment, the user needs to provide his/her user credentials to enable the word page to locate user's favorites module 56 in the persistent data store (such as a relational database). Saved content is displayed in the favorites module 56 in the word page 130. In one embodiment, the user may remove one or more content from the favorites module 56.

Figure 7:
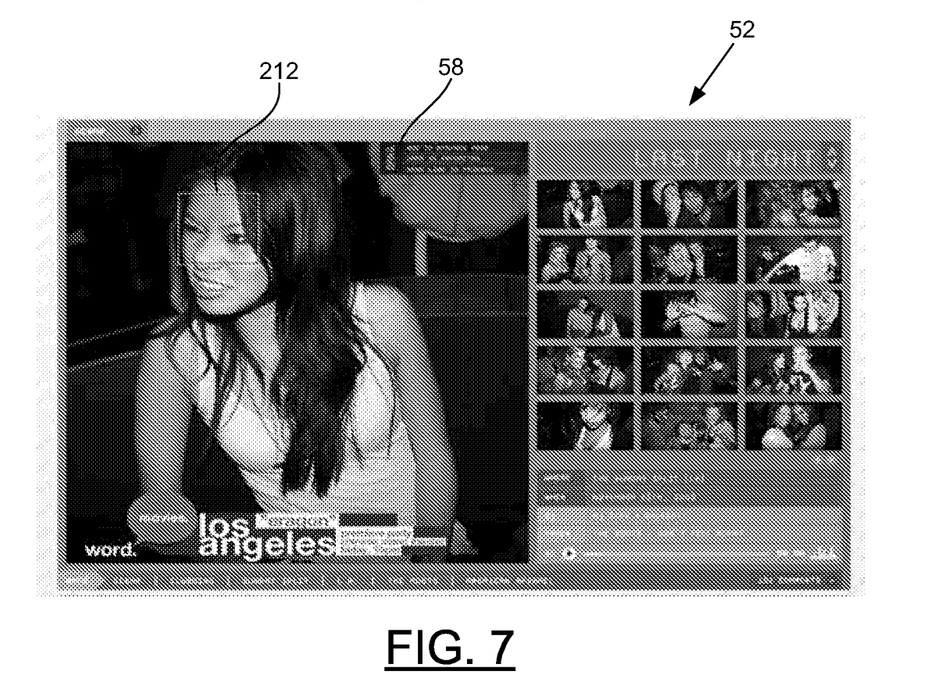
FIG. 7 illustrates position of the BANG control in a picture in a page module, in accordance with one embodiment of the present invention

Referring now to FIG. 7. In one embodiment, not only a full picture or other media type may be ported to the external websites or saved to the favorites module 56, but also, a selected part 212 of the picture in a page module 52 may be ported to the external websites or saved to the favorites module 56. The user is enabled to select a part of the picture with the help of a mouse pointer or computer keyboard. The "BANG" control 58 is displayed (not shown in the selected part 212 in FIG. 7) in the selected part 212 of the picture to enable porting or saving of the selected part 212. In another embodiment, the selected part 212 is used for entering comments for the object or objects or part of the object in the selected part 212. The porting control further includes an add-to control to start transferring the page module to other website, and the page module once transferred will retain attributes present or changed at the word page.

Figure 8:
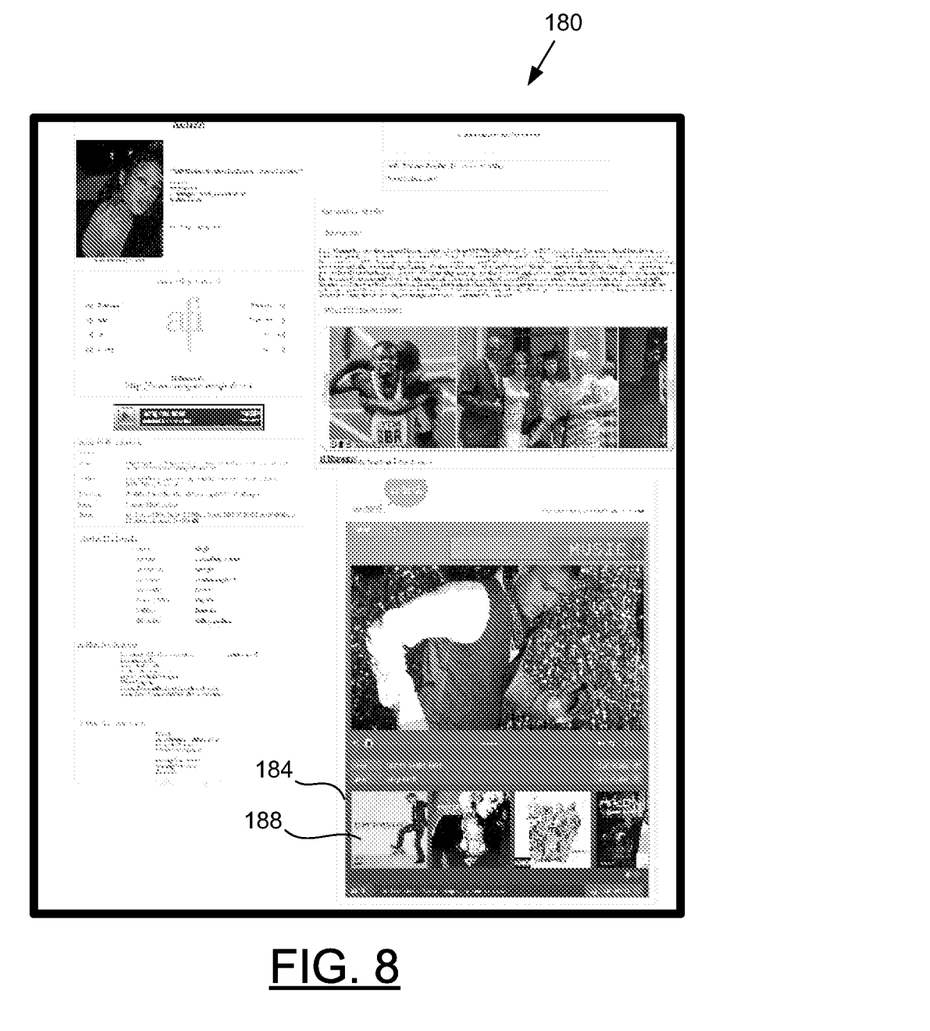
FIG. 8 illustrates the mySpace™ profile page of a user showing ported page modules and pictures, in accordance with one embodiment of the present invention.

FIG. 8 illustrates a sample mySpace™ profile page 180 that includes a picture holder 184. The picture holder 184 includes a picture strip 188 that contains thumbnails representing ported page modules and ported content of the page modules in the word page. In one embodiment, the picture holder 184 may be positioned at a user selected location in the profile page 180. In one embodiment, a thumbnail in the picture strip 188 refers back to the word website from which the content being represented by the thumbnail was ported. In another embodiment, the ported content are packaged in a format acceptable by the receiving social networking website (such as mySpace™) and sent to the receiving website at the time of the porting of the content. Hence, in this embodiment, the thumbnail does not refer back to the original word website to display the content in a normal view in the picture holder 184. In one embodiment, the ported content adapt to look and feel of the receiving website.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The programming modules, page modules, and, subsystems described in this document can be implemented using a programming language such as Flash, JAVA, C++, C, C#, Visual Basic, JAVA Script, PHP, XML, HTML etc., or a combination of programming languages. Commonly available application programming interface (API) such as HTTP API, XML API and parsers etc. are used in the implementation of the programming modules. As would be known to those skilled in the art that the components and functionality described above and elsewhere in this document may be implemented on any desktop operating system which provides a support for a display screen, such as different versions of Microsoft Windows, Apple Mac, Unix/X-Windows, Linux etc. using any programming language suitable for desktop software development.

The programming modules and ancillary software components, including configuration file or files, along with setup files required for installing the widget dock and related functionality as described in this document, are stored on a computer readable medium. Any computer medium such as a flash drive, a CD-ROM disk, an optical disk, a floppy disk, a hard drive, a shared drive, and an storage suitable for providing downloads from connected computers, could be used for storing the programming modules and ancillary software components. It would be known to a person skilled in the art that any storage medium could be used for storing these software components so long as the storage medium can be read by a computer system.

The invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

While this invention has been described in terms of several preferable embodiments, it will be appreciated that those skilled in the art upon reading the specifications and studying the drawings will realize various alternation, additions, permutations and equivalents thereof. It is therefore intended that the present invention includes all such alterations, additions, permutations, and equivalents as fall within the true spirit and scope of the invention.

What is claimed is:

1. A method for providing a page module for a word wherein the page module is dynamically created through user action related to the word, the method comprising:
   providing a page module with a word bar, a media display area, and a porting control different from the word bar;
   displaying in the word bar display a plurality of related words contextually related to the word in terms of subject;
   generating, when any word in the word bar is selected, a new word page for the selected word;
   providing the media display area to display media;
   transferring with the porting control the page module from a web page website where the page module is created to other website; and
   placing the page module having the porting control in a word page that includes one or more page modules related to the word, wherein the page module remains in the word page if the transfer of the page module occurs through the porting control, and the page module, when ported into the other website, is linked to a data store to track information related to the page module, wherein operations of the method are executed by a processor.

2. The method as recited in claim 1, wherein the other website is unrelated to the word page, but includes code of the page module if transferred to the other website from the word page.

3. The method as recited in claim 1, wherein attributes and content present on the page module in the word page remain as attributes and content when present on the other website.

4. The method as recited in claim 3, wherein the attributes and content on the page module integrates annotation structure.

5. The method as recited in claim 1, wherein the porting control further includes an add-to control to start transferring the page module to the other website, the page module once transferred will retain attributes present or changed at the word page.

6. The method as recited in claim 1, wherein the porting control further comprising a save-to-favorites control to store the page module in a favorites module.

7. The method as recited in claim 1, wherein the porting control further comprising a send-to control to send the page module to a destination via an email.

8. The method as recited in claim 2, wherein the other website is a profile page of a user in a social networking website, the profile page including a placeholder for hosting and displaying the media.

9. The method as recited in claim 8, wherein the profile page includes a placeholder for hosting and displaying the page module.

10. The method as recited in claim 1, wherein the media display area further comprises a port-to control to initiate a transfer of the media to the other website.

11. The method as recited in claim 1, wherein the media display area further comprises a save-to-favorites control to store a reference to the media in a favorites module.

12. The method as recited in claim 1, wherein the media display area further comprises a send-to control to send the media to a destination via an email.

13. The method as recited in claim 7, wherein the media is one of a still picture, a video, a graphic, a movie, a game, a commentary, a plurality of images, a text blog, a comment, or combinations thereof.

14. A method for providing a page module for a word wherein the page module is dynamically created through user action related to the word, the method comprising:
providing a page module with a word bar, a media display area, and a porting control different from the word bar;
displaying in the word bar a plurality of related words contextually related to the word in terms of subject;
generating, when any word in the word bar is selected, a new word page for the selected word;
providing the media display area to display media; and
transferring with the porting control the page module from a word page website where the page module is created to other website, the word page including one or more page modules that have contextual relation to a subject context of the word and the porting control is native to the word page that includes the one or more page modules, the page module remaining in the word page if the transfer of the page module occurs through the porting control, and data of the transferred page module is stored in a relational database to track content of the transferred page module, wherein operations of the method are executed by a processor.

15. The method as recited in claim 14, wherein the other website is unrelated to the word page, but includes code of the page module if transferred to the other website from the word page.

16. The method as recited in claim 14, wherein attributes and content present on the page module in the word page remain as attributes and content when present on the other website.

17. The method as recited in claim 14, wherein the porting control further comprising a save-to-favorites control to store the page module in a favorites module.

18. The method as recited in claim 14, wherein the porting control further comprising a send-to control to send the page module to a destination via an email.

19. The method as recited in claim 14, wherein the other website is a profile page of a user in a social networking website, the profile page including a placeholder for hosting and displaying the media.

20. The method as recited in claim 14, wherein the media display area further comprises a port-to control to initiate a transfer of the media to the other website.

21. A method for providing a page module for a word wherein the page module is dynamically created through user action related to the word, the page module method comprising:
providing a page module with a word bar, a media display area, and a porting control different from the word bar;
displaying in the word bar a plurality of related words contextually related to the word in terms of subject;
generating, when any word in the word bar is selected, a new word page for the selected word;
providing the media display area to display media; and
transferring with the porting control the page module from a web page website where the page module is created to other website, a word page including one or more page modules that have contextual relation to a subject context of the word and the page module is placed in the word page that includes the one or more page modules, the page module remaining in the word page if the transfer of the page module occurs through the porting control, the page module once transferred will retain attributes present or changed at the word page, wherein operations of the method are executed by a processor.

22. The method as recited in claim 21, wherein data of the transferred page module is stored in a relational database to track content of the transferred page module.

23. The method as recited in claim 21, wherein the other website is unrelated to the word page, but includes code of the page module if transferred to the other website from the word page.

* * * * *